United States Patent [19]
Carley et al.

[11] 3,752,254
[45] Aug. 14, 1973

[54] AUTO BATTERY THEFT PREVENTING DEVICE

[76] Inventors: Joseph E. Carley, 51 Carmon Rd., Harrington Park; Emil A. Steup, 27 Ardsleigh Dr., Madison, both of N.J.

[22] Filed: Oct. 21, 1971

[21] Appl. No.: 191,509

[52] U.S. Cl............... 180/68.5, 70/230, 70/258, 248/203
[51] Int. Cl............................................. B60r 18/02
[58] Field of Search................ 180/68.5; 70/258, 70/230, 259, 260, 58, 14, 229; 248/203; 211/4, 7, 8

[56] References Cited
UNITED STATES PATENTS
3,498,400  3/1970  Hysmith........................... 180/68.5
2,791,898  5/1957  Pegg et al. ................. 180/68.5 UX FOREIGN PATENTS OR APPLICATIONS
591,856  4/1925  France.............................. 180/68.5

Primary Examiner—Benjamin Hersh
Assistant Examiner—Milton L. Smith
Attorney—Harry B. Rook

[57] ABSTRACT

The lower ends of hold-down bolts at opposite sides of a storage battery are separably secured to anchoring structure in the engine compartment and their upper ends have elongated nuts screw-threaded thereon and tightly against the respective ends of a clamp bar that spans the top of the battery. A locking element has its ends respectively permanently secured to one nut and locked to the other nut by a key or permutation operated lock and a guard tube is associated with each hold-down bolt, said clamp bar and said anchoring structure prevents unauthorized separation of the hold-down bolts from the anchoring structure, thereby to thwart attempted theft of the battery.

6 Claims, 5 Drawing Figures

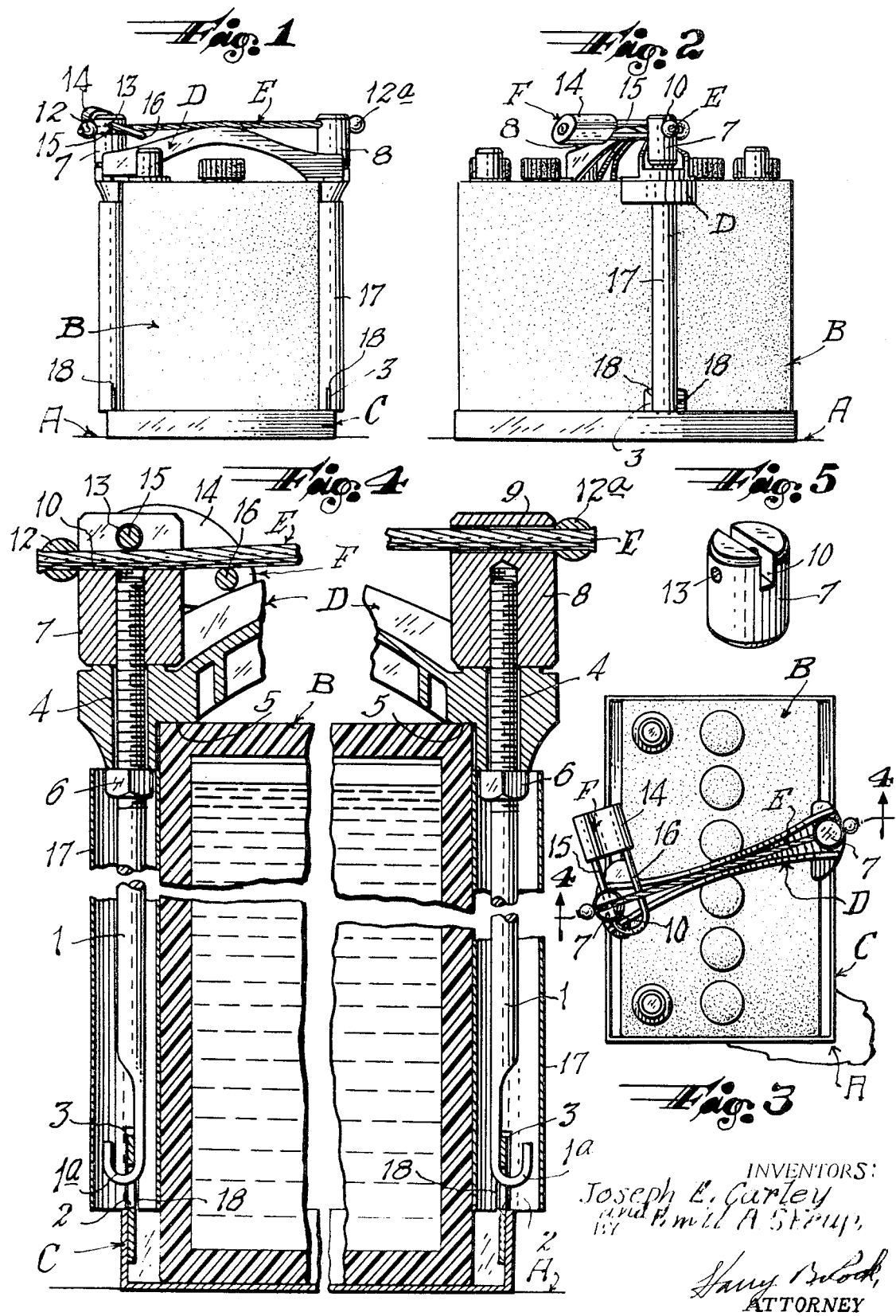

AUTO BATTERY THEFT PREVENTING DEVICE

BACKGROUND OF THE INVENTION

1. The Field of the Invention

This invention relates to means for securing a storage battery in place in an automobile in such a manner as to prevent or at least to reduce the possibility of theft of the battery.

2. The Prior Art

The prior art proposes battery locking means which includes a pair of hold-down bolts flanking the battery and separably secured at their lower ends to anchoring structure in the engine compartment of the automobile with a locking bar or strap having its ends connected and locked by key-operated lock to fittings or posts at the upper ends of the hold-down bolts and spanning the battery. Examples are shown by U.S. Pat. Nos. 3,498,400 and 2,791,898.

However, the prior art locking means leave much to be desired in that they do not prevent unauthorized disconnection of the hold-down bolts from the anchoring structure, or they are cumbersome and difficult to apply to known batteries and battery mountings, or the padlocks hang loosely and vibrate against adjacent parts with consequent rattle and possible damage to the parts.

SUMMARY OF THE INVENTION

The primary object of the present invention is to provide means for locking a storage battery in place in an engine compartment, which will overcome the objections to or disadvantages of the prior locking means, which is easy to apply to various known types of batteries and battery mountings, and which protects the connections of the hold-down bolts with the anchoring structure against such manipulation or breaking as would release the battery.

Another object is to provide in such a locking means a novel combination of a battery support and enclosing means therefor, a clamp for abutting the top of the battery hold-down bolts flanking the battery having their lower ends connected to said anchoring means and having fittings, for example nuts, secured on their upper ends holding down said clamp bar, a locking element permanently secured to one fitting and separably locked to the other fitting by a key-or permutation-operated lock having a shackle connected to the fitting and holding said locking element against separation from the fitting.

The invention also contemplates a guard associated with each hold-down bolt and said clamp bar with its lower end covering the connection of the hold-down bolt to the anchoring means to prevent access to said connection and thereby prevent separation of the bolt from the anchoring means.

A BRIEF DESCRIPTION OF THE DRAWINGS

For a complete understanding of the invention, reference should be had to the following description in conjunction with the accompanying drawings in which:

FIG. 1 is an end elevational view of a storage battery locking means embodying the invention applied to a known type of storage battery which is set in a tray that comprises a part of the battery anchoring or mounting structure.

FIG. 2 is a side elevation of the battery and locking means shown in FIG. 1;

FIG. 3 is a top plan view of the battery and locking means shown in FIGS. 1 and 2, FIG. 4 is a greatly enlarged fragmentary transverse vertical sectional view approximately on the plane of the line 4—4 of FIG. 3, and FIG. 5 is a perspective view of one of the nuts to be screwed on a hold-down bolt.

BRIEF DESCRIPTION OF THE PREFERRED EMBODIMENTS

As is well known in the art, automobile storage battery supports or mountings vary in construction and in location, and therefore, in the above-mentioned drawing only a schematic or representative illustration is made and parts not essential to an understanding of the invention have been omitted.

Specifically describing the preferred embodiment of the invention, the anchoring or mounting structure A for the battery B is shown as including a tray C secured in the engine compartment of the automobile by known means which are not shown.

Hold-down bolts 1 of generally known construction are disposed at opposite sides of the battery and have their lower ends separably connected to the anchoring structure. As here shown, the bolts have hooks 1a which pass through slots 2 in anchoring plates 3 which are rigidly and permanently secured to upstanding flange of the tray C.

The upper end of each bolt is screw-threaded and is inserted loosely through a hole 4 extending transversely through and beyond one end portion of a clamp bar D which spans or extends across the top of the battery and has shouldered seats 5 to abut the top of the battery; and a nut 6 is threaded on each bolt and abuttingly underlies the corresponding end portion of the clamp bar.

Fittings 7 and 8 in the form elongated nuts have central threaded bores each of which mates with the threaded end of one bolt to abut the top side of said clamp bar. A locking element E has one end permanently secured to one nut, here the nut 8, and its other end separably connected and locked to the other nut after they have been tightened against the clamp bar so as to prevent rotation of the nuts in such a way as to loosen them.

The nut 8 has a transverse hole 9 and the nut 7 has a transverse slot 10 preferably disposed in an axial plane of the bore and extending through the outer end of the nut. The locking element has its end portions extending through said hole 9 and removably insertable into the said slot 10, respectively. The locking element has heads 12 and 12a fixed on its extremities, the spacing of the heads from each other being such that each head abuts the side of its corresponding nut to prevent longitudinal movement of the locking element relatively to the nuts when the nuts are applied to their respective bolts.

To prevent the locking element from being moved laterally outwardly through the end of the slot in the nut 7, said nut has a hole 13 extending therethrough transversely of the slot to removably receive the bolt or shackle of a key-operated or permutation lock F in overlying relation to the locking element E when the nuts are in normal battery-clamping relation to the clamp D and the locking element is in the slot, as best shown in FIGS. 3 and 4 of the drawing. Preferably a padlock is utilized, having the usual body 14 and a U- shaped shackle one arm 15 of which is removably insertable through the hole 13 above the locking element while the other arm 16 is removably insertable between the locking element and the battery clamp D.

Associated with each hold-down bolt, the clamp D and the anchoring structure is a guard 17 to protect the connection of the hold-down bolt to the anchoring structure against such manipulation or breaking as would release the battery. The guard is shown as comprising a metal tube of a diameter to loosely slide upon the bolt with a telescoping action with its upper end to abut the underside of the clamp D and with its lower end engaging the anchoring structure. With the particular connection shown, the wall of the tube has diametrically opposite slots opening through the end of the tube and of a width to slidably slip over the anchoring plate 3 the tube being of a diameter to slip over the hook 1a and of a length such that the end of the tube abuts the edge of the tray when the parts are assembled in battery-locking condition as shown in the drawings and most clearly appearing in FIG. 4, and the hook and its connection with the anchoring plate are covered and rendered inaccessible by the guard tube.

The form and dimensions of the locking element and guards may vary depending upon the battery, the anchoring or mounting structure, the clamp and the manner of associating the hold-down bolts with the clamp and anchoring structure, and while the locking element could be a rigid headed bar, preferably as shown, the locking element comprises a length of heavy flexible wire cable having perforated metal beads fixedly secured thereon as by welding or compression thereby providing the heads, and the guards are tubes interposed endwise between the clamp and the anchoring structure. Instead of a single clamp bar D, there could be a clamp associated with each hold-down bolt.

In assembling the several parts here shown, the battery is set on its tray, the guard tubes are slipped on the hold-down bolts, the hooks are connected to the anchoring plates, the threaded ends of the bolts are slipped through the holes in the clamp bar and after adjustment of the nuts on the bolts to provide proper bearing of the clamp bar on the top of the battery, and with the locking element connected to the nut 8, the locking nuts 7 and 8 are screwed onto the bolts and tightened to firmly clamp the battery between the clamp bar and the tray and to approximately align the slot in the nut 7 with the hole in nut 8. Then the free end of the locking element is set into the groove in the nut 7 and the shackle arms are inserted through the hole 13 in the nut 7 and between the clamp and the locking element, respectively, and locked in the lock body 14, as best shown in FIG. 4.

After completion of the assembly the battery is firmly locked against removal from its mounting structure, except by unlocking the lock or willful destruction of the parts which are of such nature and so strong as to dissuade or thwart any attempts to steal the battery.

We claim:

1. In battery theft-preventing means, the combination with battery anchoring structure, hold-down bolts to receive a battery between them and each having a connection at its lower end with said anchoring structure and its upper end screw-threaded, and battery clamp means to engage the top of a battery in said anchoring means slidably associated with the threaded ends of the bolts, of a nut on the screw-threaded end of each bolt to exert pressure on said clamp means to hold said battery in said anchoring structure, and a locking element having one end permanently secured to one nut, the other nut having a slot opening through one end to separably receive said locking element and having a hole transverse of said slot and above said locking element when the latter is in the slot and a lock having a shackle to pass through said hole in overlying relation to said locking element, the end portions of said locking element being coactive with said nuts to prevent longitudinal movement of said locking element relatively to said nuts.

2. In battery theft-preventing means as defined in claim 1, said end portions of the locking element having heads to abut the sides of the respective nuts.

3. In battery theft-preventing means as defined in claim 1, said locking element being a length of flexible heavy wire cable the end portions of which have heads rigidly secured thereon to abut the sides of the respective nuts.

4. In battery theft-preventing means as defined in claim 1 with the addition of a guard to be interposed on each hold-down bolt between said clamp means and said anchoring means and covering said connection between said hold-down bolt and said anchoring means, thereby to prevent access to or tampering with said connection.

5. In battery theft-preventing means as defined in claim 4, said connection between the hold-down bolt and the anchoring means comprising a hook on the end of the bolt passing through a slot in an anchoring plate, and said guard being a metal tube telescoped on said bolt with the upper end of the tube abutting said clamp means and its lower end provided with diametrically opposite slots in its wall to receive edgewise said anchoring plate and with the lower end of the tube covering said connection and abutting the anchoring means.

6. In battery theft-preventing means, the combination with battery anchoring structure, hold-down bolts to receive a battery between them and each having a connection at its lower end with said anchoring structure and its upper end screw-threaded, and battery clamp means to engage the top of a battery in said anchoring means slidably associated with the threaded ends of the bolts, of a nut on the screw threaded end of each bolt to exert pressure on said clamp means to hold said battery in said anchoring structure, and a locking element having one end permanently secured to one nut, and a lock having a shackle, said locking element and said shackle being coactive with the other nut to releasably lock together said locking element, said shackle and said nut, and a guard to be interposed on each hold-down bolt between said clamp means and said anchoring means and covering said connection between said hold-down bolt and said anchoring means, thereby to prevent access to or tampering with said connection.

* * * * *